US008832261B1

(12) United States Patent
Ybarra, III

(10) Patent No.: US 8,832,261 B1
(45) Date of Patent: *Sep. 9, 2014

(54) PERFORMANCE TUNING OF IT SERVICES

(75) Inventor: Paul N. Ybarra, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 262 days.

This patent is subject to a terminal disclaimer.

(21) Appl. No.: 13/306,729

(22) Filed: Nov. 29, 2011

Related U.S. Application Data

(63) Continuation of application No. 11/861,273, filed on Sep. 25, 2007, now Pat. No. 8,069,240.

(51) Int. Cl.
*G06F 15/173* (2006.01)
*H04L 12/24* (2006.01)

(52) U.S. Cl.
CPC ........ *H04L 41/5012* (2013.01); *H04L 41/5016* (2013.01)
USPC .......................................................... 709/224

(58) Field of Classification Search
CPC ............ H04L 47/821–47/823; H04L 12/2634; H04L 41/5013; H04L 41/5016; H04L 43/0888
USPC ........................................................ 709/224
See application file for complete search history.

(56) References Cited

U.S. PATENT DOCUMENTS

| | | | |
|---|---|---|---|
| 4,858,120 A | 8/1989 | Samuelson | |
| 5,764,912 A | 6/1998 | Rosborough | |
| 5,966,372 A | 10/1999 | Wright et al. | |
| 5,978,770 A | 11/1999 | Waytena et al. | |
| 6,212,562 B1 | 4/2001 | Huang | |
| 6,609,159 B1 | 8/2003 | Dukach et al. | |
| 6,792,393 B1 | 9/2004 | Farel et al. | |
| 7,103,562 B2 | 9/2006 | Kosiba et al. | |
| 7,643,469 B2 | 1/2010 | Alicherry et al. | |
| 2002/0095325 A1 | 7/2002 | Chiles | |
| 2002/0184069 A1 | 12/2002 | Kosiba et al. | |
| 2005/0198682 A1 | 9/2005 | Wright | |

(Continued)

OTHER PUBLICATIONS

Lazowska et al. "Quantitative System Performance. Chapter 2: Conducting a Modelling Study." Published in 1984. Retrieved from the Internet on Oct. 31, 2013. <URL: http://homes.cs.washington.edu/~lazowska/qsp/Images/Chap_02.pdf>.*

(Continued)

*Primary Examiner* — Larry Donaghue
(74) *Attorney, Agent, or Firm* — Baker & Hostetler LLP

(57) ABSTRACT

Methods and systems are disclosed for modeling the performance of an IT service. The methods and systems take a holistic approach by treating the entire IT service instead of the individual nodes. In one implementation, the methods and systems provide a tool for mapping the performance of the IT service based on throughput and response time data. The tool may then be used to develop a mathematical model for the performance of the IT service. System parameters that may impact the performance of the IT service may be correlated to variables in the model. The model may then be used to predict the impact changes may have on the performance of the IT service. Performance maps for the same IT service may be compared over time to discern any departure from a norm. A database of performance maps may be established for a particular industry to facilitate intra-industry comparisons.

20 Claims, 7 Drawing Sheets

(56) References Cited

U.S. PATENT DOCUMENTS

| | | |
|---|---|---|
| 2005/0203962 A1 | 9/2005 | Zhou et al. |
| 2007/0168494 A1* | 7/2007 | Liu et al. ........................ 709/224 |
| 2007/0192266 A1 | 8/2007 | Tiwari et al. |
| 2008/0133435 A1 | 6/2008 | Chintalapti |
| 2008/0221954 A1 | 9/2008 | Reisz |
| 2009/0319931 A1 | 12/2009 | Hutchings et al. |

OTHER PUBLICATIONS

Chung, I. "Towards Automatic Performance Tuning." Dissertation submitted to University of Maryland, College Park, 2004, [retrieved from the Internet on Jan. 24, 2008 using <URL: http://www.dyninst.org/papers/ChungDissertation.pdf>].

Elnaffar, S. "Towards Workload-Aware DBMSS: Identifying Workload Type and Predicting Its Change." Thesis submitted to Queen's University, Sep. 2004, [retrieved from the Internet on Jan. 24, 2008 using <URL:http://www.cs.queensu.ca/home/cords/se04.pdf&.

Lazowska et al. "Computer System Performance Evaluation Using Queueing Network Models." Copyright Jun. 1986. Retrieved from Annual Reviews.org on Jul. 6, 2011.

Lazowska et al. "Quantative System Performance." Chapters 1, 3 and 5. [Retrieved online on Oct. 26, 2009] . COPYRGT. 1984 by Prentice-Hall,Inc., Englewood Cliffs, NJ 07632. [Retreived from the Internet] <URL: http://www.cs.washington.edu/homes/lazowska.

Siewert, S. "Big iron lessons, Part 3: Performance monitoring and tuning." IBM developerWorks, Apr. 19, 2005, [retrieved from the Internet on Jan. 24, 2008 using <:URL: http://www-128.ibm.com/developerworks/power/library/pa-bigiron3l>].

Thereska, E., Narayanan, D., Ailamaki, A., and Ganger, G. "Observer: keeping system models from becoming obsolete." Parallel Data Laboratory, Carnegie Mellon University, Jan. 2007.

Cuomo, Gennaro; A Methodology for Production Performance Tuning; Sep. 13, 2000; IBM; Version 1.0; pp. 1-11.

* cited by examiner

PERFORMANCE TUNING OF IT SERVICES

CROSS-REFERENCE TO RELATED APPLICATIONS

This application is a Continuation of U.S. patent application Ser. No. 11/861,273, filed on Sep. 25, 2007, now U.S. Pat. No. 8,069,240, entitled "Performance Tuning of IT Services," and is related in subject matter to, and incorporates herein by reference in its entirety, each of the following: U.S. patent application Ser. No. 11/861,274, filed on Sep. 25, 2007, entitled "Performance Tuning of IT Services,"; and U.S. patent application Ser. No. 11/861,275, filed on Sep. 25, 2007, entitled "Performance Tuning of IT Services."

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to estimates of processor throughput and, more specifically, to systems and methods for adjusting such throughput estimates in processors to account for distortions in measured usage.

BACKGROUND

Widespread acceptance of the Internet and proliferation of online transactions and electronic commerce ("e-commerce") has placed increasingly greater importance on information technology (IT) services and their underlying infrastructure. Businesses rely on these IT services everyday to conduct an ever expanding array of transactions with their customers, including banking transactions, credit card transactions, investment transactions, and the like. It is therefore imperative for these businesses to maintain their IT services performing at peak throughput levels and efficiency in order to process as many transactions as possible. The process of maintaining of an IT service performing at peak throughput levels is referred to herein as performance tuning.

An IT service for a typical transaction, such as a bank deposit, may involve several pieces of a IT equipment or nodes. For example, there may be a Web server for receiving a request from a customer over the Internet, an application server for providing a bank deposit application to the Web server, a backend server for processing the bank deposit, and a database for storing and updating the customer's records. Each one of these servers individually may affect the speed with which the entire transaction is conducted and, hence, the throughput of the IT service and response time for the customer. Similarly, each server may contain numerous components that may affect the efficiency of the server.

Traditionally, performance tuning of IT services involved analyzing the individual nodes of the IT service. This may include, for example, checking the speed of the processors at each node, the type and amount of memory, the size of the hard drives, and the like. Other factors possibly affecting the performance of an individual node may include, for example, whether parallel processing may or may not be occurring, any memory and/or disk drive thrashing, and the like. With such an array of variables, performance tuning of IT services tended to be a tedious and time consuming process. IT service personnel were often relegated to changing one variable at a time and observing the impact of the change on the node. As a result, traditional performance tuning of IT services was largely an iterative process that relied heavily on the use of trial and error.

Accordingly, what is needed is a more efficient way to tune the performance of an IT service. More specifically, what is needed is a way to model the performance of an IT service and to predict the impact a change may have on the performance using the model.

SUMMARY

The disclosed embodiments are directed to methods and systems for modeling the performance of an IT service and predicting the impact a change may have on the performance using the model. The methods and systems rely on elements of queuing theory to treat the entire IT service holistically instead of as individual nodes. In one implementation, the methods and systems provide a tool for mapping the performance of the IT service based on observed or simulated throughput and response time data. The tool may then be used to develop a mathematical model for the performance of the IT service. System parameters that may impact the performance of the IT service are correlated to variables in the mathematical model. The mathematical model may then be used to predict the impact a change may have on the performance of the IT service. Performance maps for the same IT service may be compared over time to discern any departure from a predefined norm. A database of such performance maps may be established for a particular industry to facilitate intra-industry comparisons.

BRIEF DESCRIPTION OF THE DRAWINGS

The foregoing and other advantages of the invention will become apparent from the following detailed description and upon reference to the drawings, wherein.

DETAILED DESCRIPTION

Figure 1:
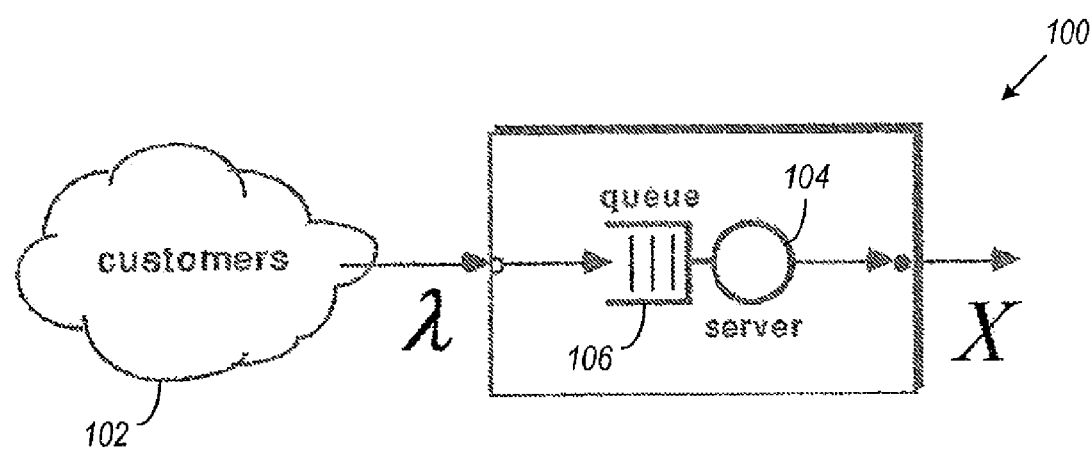
FIG. 1 illustrates an example of a single-server queuing system.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

As mentioned above, the disclosed embodiments rely on elements of queuing theory to treat an entire IT service holistically instead of as individual nodes. Referring now to FIG. 1, a single-server queuing system 100 is shown wherein customers 102 wishing to access a server 104 to conduct a transaction are placed in a queue 106. The customers 102 arrive at the queue 106 at a rate $\lambda$ that may be expressed as $\lambda=A/T$, where A equals the number of customers 102 arriving in an observation interval T. Throughput X for the single-server system 100 may be defined as $X=C/T$, where C is the number of customers 102 who have completed the transaction. Throughput X is equal to rate $\lambda$ at steady state. The utilization U of the server 104 may be expressed as $U=B/T$, where B the amount of time (e.g., in seconds) that the server 104 is busy serving requests. The mean service time D per customer 102 may be defined as $D=B/C$.

If the average number of customers 102 in the system 100 is Q and the average time these customers 102 spend in the system is R for each system, then queuing theory states that $U=XD$ (the "Utilization Law") and $Q=\lambda R$ ("Little's Law"). The distinction between the mean service time D per customer 102 and the average time R customers 102 spend in the system 100 lies in the fact that the amount of time W spent waiting for service is not included in the former. In other words, R is the sum of the time W the customer 102 spent waiting plus the time D he/she spent being serviced: $R=W+D$. The average time R is also known as the "Response Time Law."

A queue length Q can be determined from the above response time equation, $R=W+D$, by multiplying R and $\lambda$: $Q=\lambda W+\lambda D$. The utilization U of the queue 106 can be defined by looking at the service time contribution of the queue 106, or $U=\lambda D$, which is another way to measure utilization. This relationship is sometimes referred to as "Little's Micro Law." Utilization can thus be interpreted as the average number of customers 102 in service and is part of the total queue length Q.

The "Response Time Law" may also be defined as $R=N/X-Z$, where N is the number of customers 102 that may request a transaction (i.e., the possible population of customers 102) and Z is the time between requests, euphemistically referred to as "thinking time." The thinking time Z is essentially an idle time that the customer 102 may spend, for example, looking at and browsing different aspects of a Web site, and is considered outside the confines of the queue 106. Note that the Utilization Law and Little's Law may be applied to both open and closed queues, whereas the Response Time Law depends on N and thus is only valid for closed queue models. This Response Time Law may be used in queuing theory to determine the response time in a timesharing system, as discussed below.

Figure 2:
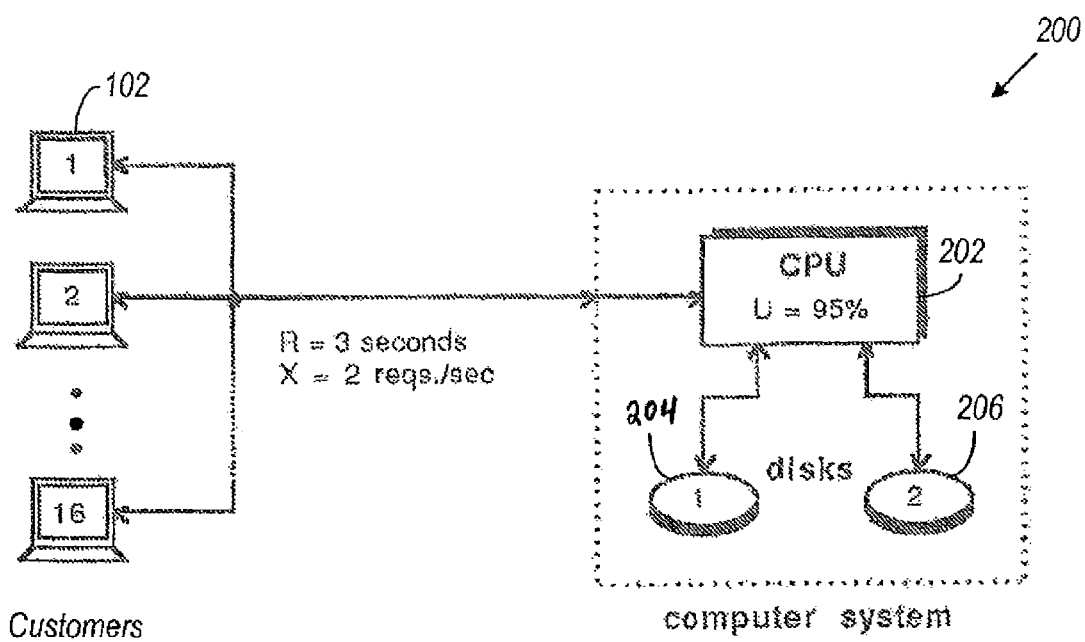
FIG. 2 illustrates an exemplary timesharing system that may be used for performance tuning of IT services according to the disclosed embodiments.

FIG. 2 illustrates an example of a timesharing system 200 that may be used in accordance with the disclosed embodiments. The timesharing system 200 here is a typical single-server queue timesharing system with a CPU 202 and two hard drives 204 and 206, but certainly other configurations known to those having ordinary skill in the art may be used. The number of customers 102 that may request service from the timesharing system 200 in this example is N=16. Note that each of the two hard drives 204 and 206 may also represent a single-server queue timesharing system. Thus, the Utilization Law and Little's Laws may be applied to each of these single-server queues in the manner explained in FIG. 1. In a similar manner, a multi-tiered timesharing system in which a Web server queue is connected to an application server which is in turn connected to a database server queue may also with be represented as a single-server queue.

If several, say n, single-server queuing timesharing systems are connected together in cascade fashion, then the service time of each server may be expressed as $D_i$, $i \in n$. The amount of time waiting in the queue for each server may be written as $W_i$, $i \in n$. Thus, the average response time at each queue may be defined as $R_i=W_i+Di$, $i \in n$. The response time of the entire multi-queue timesharing system may then be expressed as:

$$D = \sum_{i=1}^{n} D_1 \qquad \text{Eq. 1}$$

The server with the largest service time may be denoted as $D_{max}=\max(D_i)$, $i \in n$, so that the total service time, excluding time waiting for service, may be defined as:

$$R = \sum_{i=1}^{n} R_i = \sum_{i=1}^{n} (W_i + D_i) \qquad \text{Eq. 2}$$

Figure 3:
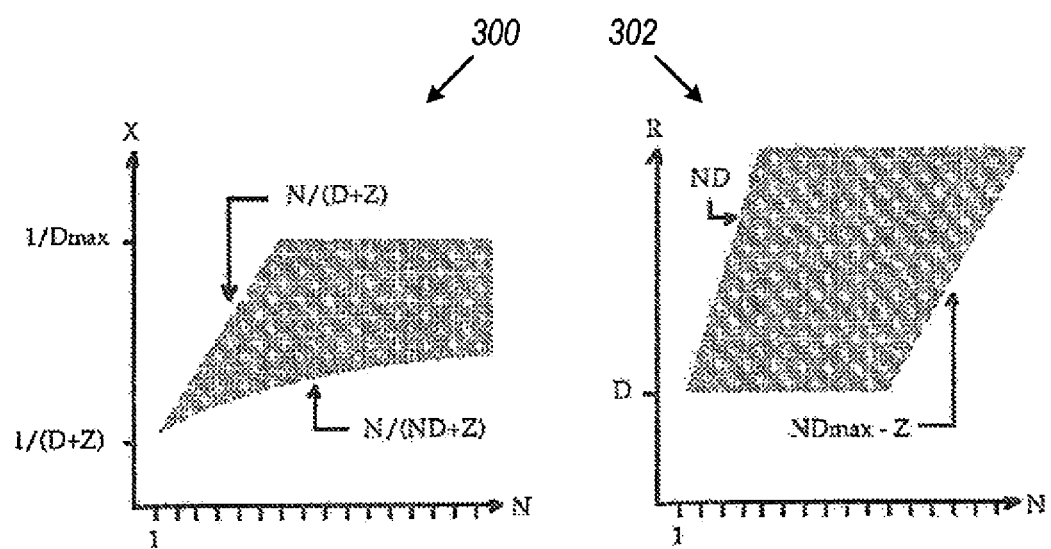
FIG. 3 illustrates performance maps that may be used for performance tuning of IT services in the disclosed embodiments.

With the foregoing definitions, it is possible to define one or more performance maps for the timesharing system 200, for example, using the asymptotic bounds or limits of the timesharing system, as shown in FIG. 3. The performance maps in essence define the range of possible values that a point on any performance curve may have for the timesharing system 200. In FIG. 3, the graph on the left is a performance map 300 of the throughput X and the graph on the right is a performance map 302 of the response time R for the timesharing system 200.

Referring to the throughput performance map 300 first, it may be surmised from the above that the best possible throughput for the timesharing system 200 occurs when there is no queuing at any of the other queues and when the slowest server (highest $D_i$) reaches maximum utilization, or 100%. The maximum throughput is then governed by this limit and may be denoted as $X_{max}=1/D_{max}$. If a customer 102 arrives at a multi-queue timesharing system and every queue is empty and thus every server is available to service the customer, then the total service time he/she will experience is D. Thus, after thinking for a time Z, the customer's total response time will be R=D+Z. By Little's Law, the queue length Q may be expressed as Q=λR=XR, assuming steady state. Thus, the throughput X may be expressed as X=Q/R. The maximum asymptotic bound for throughput that may thus be achieved is when the queue length equals the number of customers in the timesharing system, or Q=N. And when the response time R=D+Z is the smallest possible response time for any customer in the timesharing system, the throughput upper asymptotic bound may be expressed as X=N/(D+Z). At the other end, when there is only one customer in the timesharing system, or N=1, the throughput asymptotic bound equals X=1/(D+Z). And the absolute worst throughput that may be observed occurs when the customer 102 arrives at the queue to find the other N−1 customers already in the timesharing system. Here, the customer's response time will be his/her own think time Z plus the service times of each of the other customers in front of him/her, or (N−1)·D, and the time to service his/her own request D. The throughput in this situation may be expressed as X=Z+(N−1)D+D=ND+Z. Thus, using Little's Law once again, the lower asymptotic bound becomes N/(ND+Z). Note that the queue length is being set as Q=N in Little's Law, as the bound is determined by assuming all customers are in the timesharing system.

Referring now to the response time performance map 302, in the worst scenario, there is no think time Z and the customer 102 finds N−1 customers ahead of him/her. The customer's response time in that may scenario then be expressed as R=(N−1)D+D=ND. The best possible response time occurs if there is no queuing and thus the total response time of a customer entering the timesharing system is the mean service time per customer, or D. Once the timesharing system 200 begins to reach 100% utilization, however, queuing begins to occur. At that point, using the Response Time Law and setting the throughput at $X=X_{max}$, the remaining response time boundary for the performance map 302 may be expressed as $R=N/X_{max}-Z=ND_{max}-Z$.

Figure 4:
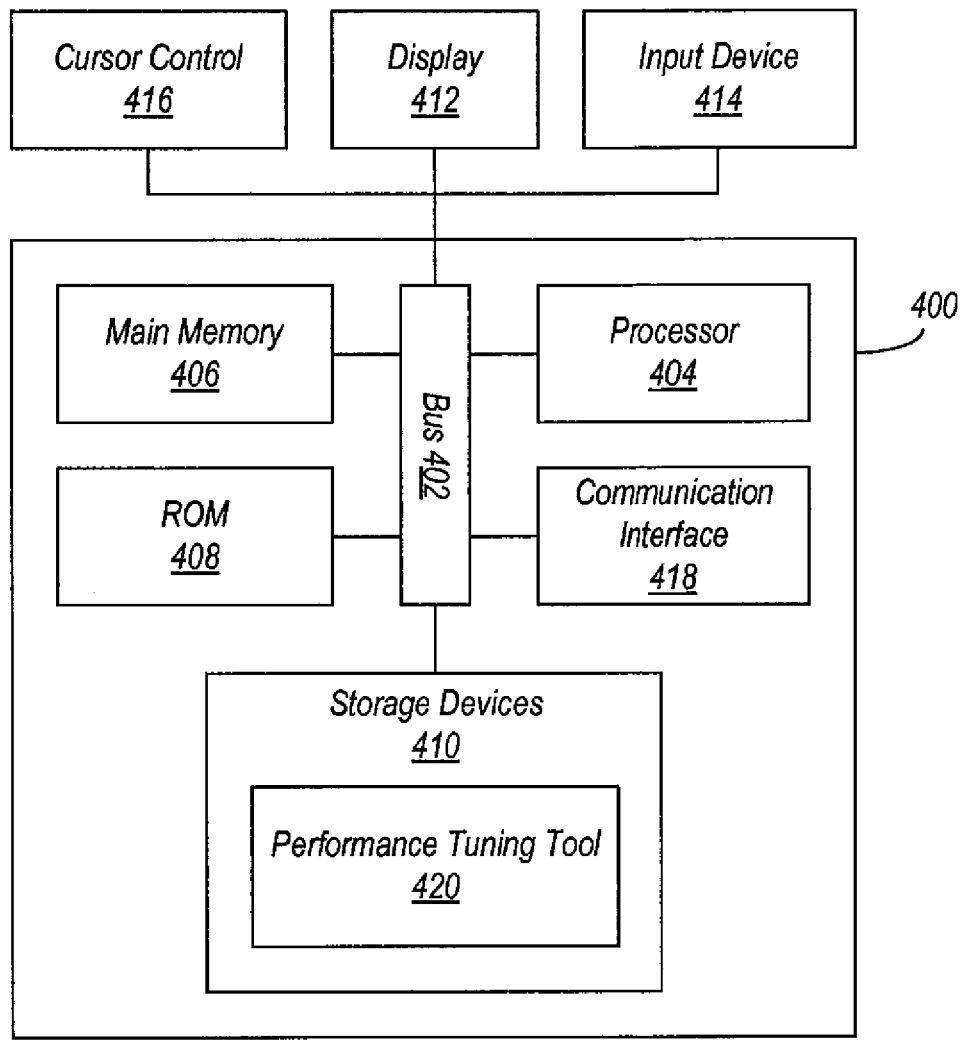
FIG. 4 illustrates an exemplary system for performance tuning of IT services according to the disclosed embodiments.

In some embodiments, the techniques discussed above for deriving the performance maps and performance coefficients a, b and c may be implemented in a performance tuning system, shown in FIG. 4 at 400. Such a performance tuning system 400 may then be used to fine tune the performance of various IT services within a company. Any suitable computing system known to those having ordinary skill in the art may be used as the performance tuning system 400, including a personal computer, workstation, mainframe, and the like.

The performance tuning system 400 typically includes a bus 402 or other communication mechanism for communicating information and an processor 404 coupled with the bus 402 for processing information. The performance tuning system 400 may also include a main memory 406, such as a random access memory (RAM) or other dynamic storage device, coupled to the bus 402 for storing computer-readable instructions to be executed by the processor 404. The main memory 406 may also be used for storing temporary variables or other intermediate information during execution of the instructions to be executed by the processor 404. The performance tuning system 400 may further include a read-only memory (ROM) 408 or other static storage device coupled to the bus 402 for storing static information and instructions for the processor 404. A computer-readable storage device 410, such as a magnetic, optical, or solid state device, may be coupled to the bus 402 for storing information and instructions for the processor 404.

The performance tuning system 400 may be coupled via the bus 402 to a display 412, such as a cathode ray tube (CRT) or liquid crystal display (LCD), for displaying information to a user. An input device 414, including, for example, alphanumeric and other keys, may be coupled to the bus 402 for communicating information and command selections to the processor 404. Another type of user input device may be a cursor control 416, such as a mouse, a trackball, or cursor direction keys for communicating direction information and command selections to the processor 404, and for controlling cursor movement on the display 412. The cursor control 416 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 404 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 410. Volatile media may include dynamic memory, such as main memory 406. Transmission media may include coaxial cables, copper wire and fiber optics, including wires of the bus 402. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 404 for execution. For example, the instructions may initially be borne on a magnetic disk of a remote computer. The remote computer can load the instructions into its dynamic memory and send the instructions over a telephone line using a modem. A modem local to the performance tuning system 400 can receive the data on the telephone line and use an infrared transmitter to convert the data to an infrared signal. An infrared detector coupled to the bus 402 can receive the data carried in the infrared signal and place the data on the bus 402. The bus 402 carries the data to the main memory 406, from which the processor 404 retrieves and executes the instructions. The instructions received by the main memory 406 may optionally be stored on the storage device 410 either before or after execution by the processor 404.

The performance tuning system 400 may also include a communication interface 418 coupled to the bus 402. The communication interface 418 typically provides a two way data communication coupling between the performance tuning system 400 and the network 110. For example, the communication interface 418 may be an integrated services digital network (ISDN) card or a modem used to provide a data communication connection to a corresponding type of telephone line. As another example, the communication interface 418 may be a local area network (LAN) card used to provide a data communication connection to a compatible LAN. Wireless links may also be implemented. Regardless of the specific implementation, the main function of the communication interface 418 is to send and receive electrical, electromagnetic, optical, or other signals that carry digital data streams representing various types of information.

In accordance with the disclosed embodiments, a performance tuning tool 420, or more accurately, the computer-readable instructions therefore, may reside on the storage device 410. The performance tuning tool 420 may then be executed to fine tune or analyze the performance of various IT services. In addition, the performance tuning tool 420 may be used to predict the impact that a change in the environment of the IT services may have on the performance of the IT services. Such a performance tuning tool 420 may be implemented using any suitable programming language known to those having ordinary skill in the art, including Java, C++, Visual Basic, and the like. It should also be noted that, in some embodiments, instead of residing on the storage device 410 of the performance tuning system 400, the performance tuning tool 420 may instead be run from a central location on a network.

Figure 5:
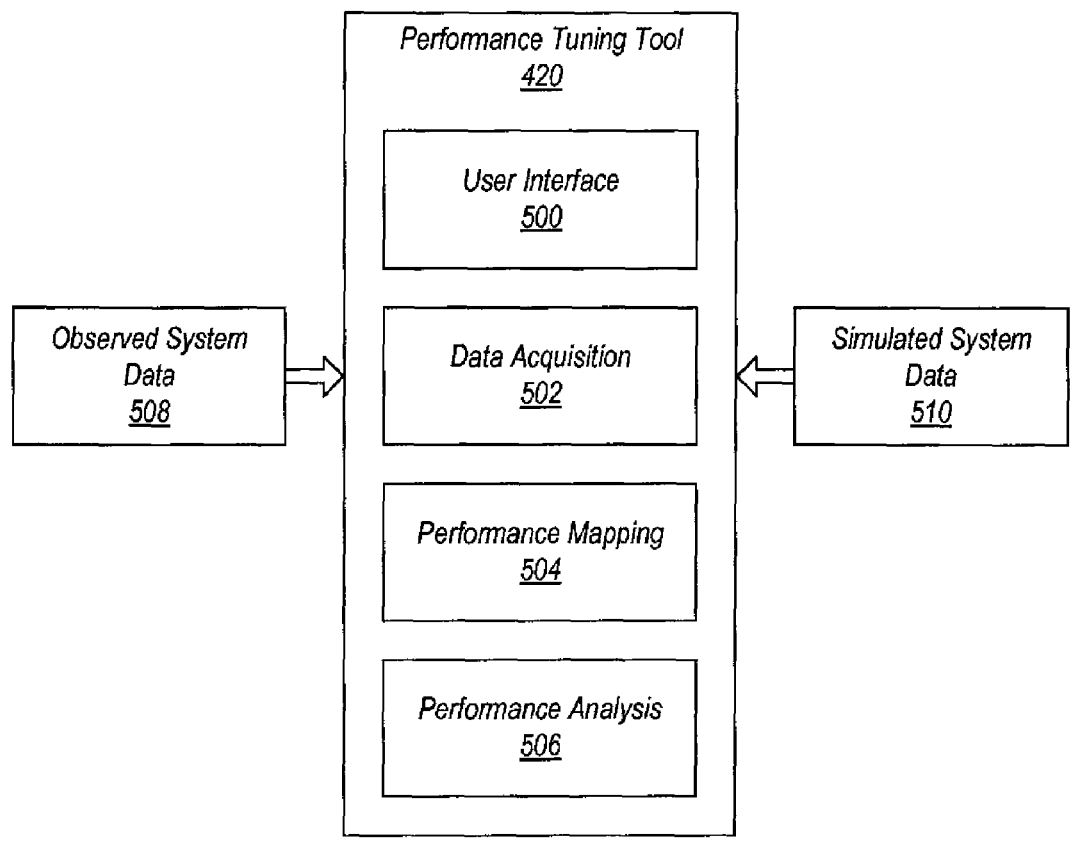
FIG. 5 illustrates an exemplary tool for performance tuning of IT services according to the disclosed embodiments.

Referring now to FIG. 5, in one embodiment, the performance tuning tool 420 may comprise a number of functional components, including a user interface module 500, a data acquisition module 502, a performance mapping module 504, and a performance analysis module 506. Other functional components may also be added to or removed from the performance tuning tool 420 without departing from the scope of the disclosed embodiments. Note that although the various functional components 500-506 of the performance tuning tool 420 have been shown as discrete units in FIG. 5, those having ordinary skill in the art will understand that two or more of these components may be combined into a single component, and that any individual component may be divided into several constituent components, without departing from the scope of the disclosed embodiments.

In general, the user interface module 500 is responsible for allowing the user to interact with the various functional components of the performance tuning tool 420 as needed. To this end, the user interface module 500 may provide a graphical user interface for receiving input from the user. Such input may include, for example, basic information about the user, the systems that support the IT service to be analyzed by the performance tuning tool 420, the location of any data to be acquired by the performance tuning tool 420, and the like. In some embodiments, instead of manual user input, it is also possible for performance tuning tool module 420 to automatically obtain some or all of this information, for example, from a predefined database containing the information (i.e., in the case of a repeat analysis). And in addition to receiving inputs, the graphical user interface may also be used to present the results of the performance analysis to the user.

The data acquisition module 502 may function to acquire the response time and throughput data for the IT service being analyzed. This data may include data represented by one or more of the variables needed to generate the throughput performance map 300 and/or the response time performance map 302 mentioned above. Such data may include, for example, the number of customers N, the service time D, the think time Z, and/or any other data that may be used to derive such data. The data may be actual historical data 508 observed over time, for example, in a test or preproduction environment, or it may be data 510 that has been simulated using a commercially available load simulation pool. An example of a suitable simulation tool may be Mercury LoadRunner available from Hewlett-Packard Corporation of Palo Alto Calif.

Performance maps may then be derived by the performance mapping module 504 from the data acquired by the data acquisition module 502. In one embodiment, the performance mapping module 504 may perform this mapping function using the equations derived above with respect to FIG. 3. Thus, the performance mapping module 504 may use these equations to calculate the various boundaries of the throughput performance map 300 and the response time performance map 302. The mapping may also be done, for example, by plotting the data obtained from the data acquisition module 502 to directly map the performance maps 300 and 302. These performance maps essentially define the performance boundaries of a particular IT service. Such boundaries allow IT personnel to quickly determine, for example, when the IT service may be approaching a performance boundary and to take any actions that may be appropriate.

The performance analysis module 506 may function to facilitate analysis of the performance of the IT service relative to the performance maps 300 and 302. In one implementation, the performance map may generate a performance curve for the IT service using the response time and throughput data. As with the performance mapping module 504, the response time and throughput data used by the performance analysis module 506 may be data acquired by the data acquisition module 502. In some embodiments, such data may be a subset of the data acquired by the data acquisition module 502 for the performance mapping module 504. In any event, the data used to generate the performance curve may represent one implementation or configuration of the IT service. Different implementations or configurations may result in different performance curves for the IT service.

Figure 6:
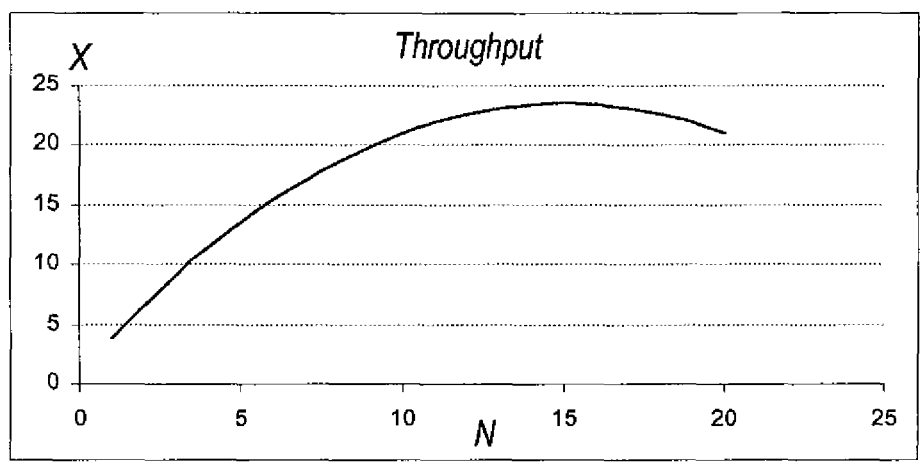
FIG. 6 illustrates an exemplary curve representing a mathematical model of a performance map according to the disclosed embodiments.

An example of a performance curve for performance is shown at 600 in FIG. 6, where the vertical axis represents the throughput (e.g., transactions/second) for the IT service and the horizontal axis represents the number of customers. Such a curve may be derived empirically using sampled data, or it may be simulated using any suitable commercially available load simulator software (e.g., Mercury LoadRunner). By observing the performance curve 600, those having ordinary skill in the art will recognize it is not amenable to description by a first-order polynomial. On the other hand, a second order polynomial, or quadratic equation, may be used, and has been confirmed, to completely describe such a performance curve

600. The quadratic equation is shown below, where the coefficients a, b and c are variables that dictate the specific curvature and shape of the performance curve 600.

$$X = aN^2 + bN + c \qquad \text{Eq.3}$$

In accordance with the disclosed embodiments, the coefficients a, b and c of the quadratic equation may derived for the quadratic equation. The coefficients may be derived using, for example, linear regression analysis or other suitable mathematical techniques known to those having ordinary skill in the art. These coefficients may then be correlated to various parameters of the IT service that affect the performance of the IT service, such as processor speed, cache coherency, memory or hard drive thrashing, parallelism, and the like. The performance coefficients a, b and c may then be modified, and the resulting change to the performance curve 600 noted, in order to determine the impact that the change may have on the IT service. Specific performance issues may then be deduced from the values of the coefficients a, b and c of the quadratic equation.

In some embodiments, correlating the performance coefficients a, b and c to the various parameters of the IT service may be performed by determining which parameters are likely to cause the behavior associated with a coefficient. Those parameters may then be attributed to that coefficient. For example, the first order coefficient b controls the slope or rate of change at any point on the performance curve 600. Thus, candidate parameters that may be attributed to the first order coefficient b may include components or resources that affect the rate at which the throughput at a given point changes when all else stays the same. These parameters for the first order coefficient b tend to affect the extent to which the IT service is queuing. An example of a parameter that may be attributed to the first order coefficient b is speed, including processor speed, memory speed, hard drive speed, and the like.

On the other hand, the second order coefficient a controls the curvature for the performance curve 600. Thus, candidate parameters that may be attributed to the coefficient a may include components or resources that affect this curvature when all else is kept the same. These parameters for the second order coefficient a are generally associated with components or resources that are shared by other components or resources of the IT service. Examples of parameters that may be attributed to the second order coefficient a include cache coherency, memory and/or disk drive thrashing, parallelism, and the like.

The zero order coefficient c generally relates to parameters associated with components or resources of the IT service that are fixed as a result of a particular implementation or configuration. Examples of parameters that may be attributed to the zero order coefficient c include the maximum number of requests that are allowed to be made of the IT service. The various parameters that are attributed to the performance coefficients a, b and c may then be stored by the performance analysis module 506 to help predict the performance resulting from a contemplated change to the IT service or to explain an otherwise unexpected performance degradation of the IT service.

In some embodiments, the performance coefficients a, b and c may be compiled and catalogued by the performance analysis module 506 for comparison analysis. The cataloging may be performed, for example, according the type of IT service, such as database service, banking service, directory service, network service, and the like. This data may then be used as future reference points to detect departures from a predefined standard, and/or it may be used to compare with other similar IT services. In the latter case, a common database may be established for the IT services a given industry to store the performance maps and performance coefficients a, b and c in order to facilitate intra-industry comparisons, and the like.

An example of the cataloging of the performance coefficients a, b and c for throughput is shown below in examples 1 and 2 for a number of IT services. As mentioned above, these coefficients uniquely determine the quadratic equation for the throughput and can be used to assess, for example, whether the measured parameters are within range with other IT services of the same type, and the like.

| | | | | | |
|---|---|---|---|---|---|
| | | Example 1 | | | |
| | | System A | | | |
| N | X (Through- | Catalogued Parameters | | | Sample System |
| (Load) | put) | a | b | c | Throughput Metrics |
| 10 | 21 | −0.10 | 3.00 | 1.00 | UDB (records written/sec) |
| 10 | 21 | −0.11 | 3.10 | 1.10 | ORACLE (records read/hour) |
| 10 | 21 | −0.12 | 3.20 | 1.20 | Vendor A CICS (transactions /sec |
| 10 | 21 | −0.13 | 3.30 | 1.30 | Vendor A IMS (transactions /sec) |
| 10 | 21 | −0.14 | 3.40 | 1.40 | Network LAN A (bits In/sec) |
| 10 | 21 | −0.15 | 3.50 | 1.50 | Network WAN A (bits In/sec) |
| 10 | 22 | −0.16 | 3.60 | 1.60 | WebSphere A (Pages/hour) |
| 10 | 22 | −0.17 | 3.70 | 1.70 | Bank Checking (transactions/sec) |
| 10 | 22 | −0.18 | 3.80 | 1.80 | Bank Savings (transactions/sec) |
| 10 | 22 | −0.19 | 3.90 | 1.90 | Investment (trades/sec) |
| 10 | 22 | −0.20 | 4.00 | 2.00 | Property & Casualty (updates/hour) |

| | | | | | |
|---|---|---|---|---|---|
| | | Example 2 | | | |
| | | System B | | | |
| N | X (Through- | Catalogued Parameters | | | Sample System |
| (Load) | put) | a | b | c | Throughput Metrics |
| 10 | 21 | −0.98 | 3.10 | 0.90 | UDB (records written/sec) |
| 10 | 21 | −0.99 | 3.20 | 1.00 | ORACLE (records read/hour) |
| 10 | 21 | −1.00 | 3.30 | 1.10 | Vendor A CICS (transactions /sec |
| 10 | 21 | −1.01 | 3.40 | 1.20 | Vendor A IMS (transactions/sec) |
| 10 | 21 | −1.02 | 3.50 | 1.30 | Network LAN A (bits In/sec) |
| 10 | 22 | −1.03 | 3.60 | 1.40 | Network WAN A (bits In/sec) |
| 10 | 22 | −1.04 | 3.70 | 1.50 | WebSphere A (Pages/hour) |
| 10 | 22 | −1.05 | 3.80 | 1.60 | Bank Checking (transactions/sec) |
| 10 | 22 | −1.06 | 3.90 | 1.70 | Bank Savings (transactions/see) |
| 10 | 22 | −1.07 | 4.00 | 1.80 | Investment (trades/sec) |
| 10 | 22 | −1.08 | 4.10 | 1.90 | Property & Casualty (updates/hour) |

In system A, the bank checking IT service has values −0.17, 3.7 and 1.7 for a, b and c, respectively. These values may then be compared with other systems (e.g., System B) supporting the same IT service to see if they are within range or are significantly different. This comparison may allow IT personnel to determine, for example, what areas may achieve better performance and, hence, where to devote capital and resources, depending on the parameter that is off.

Figure 7:
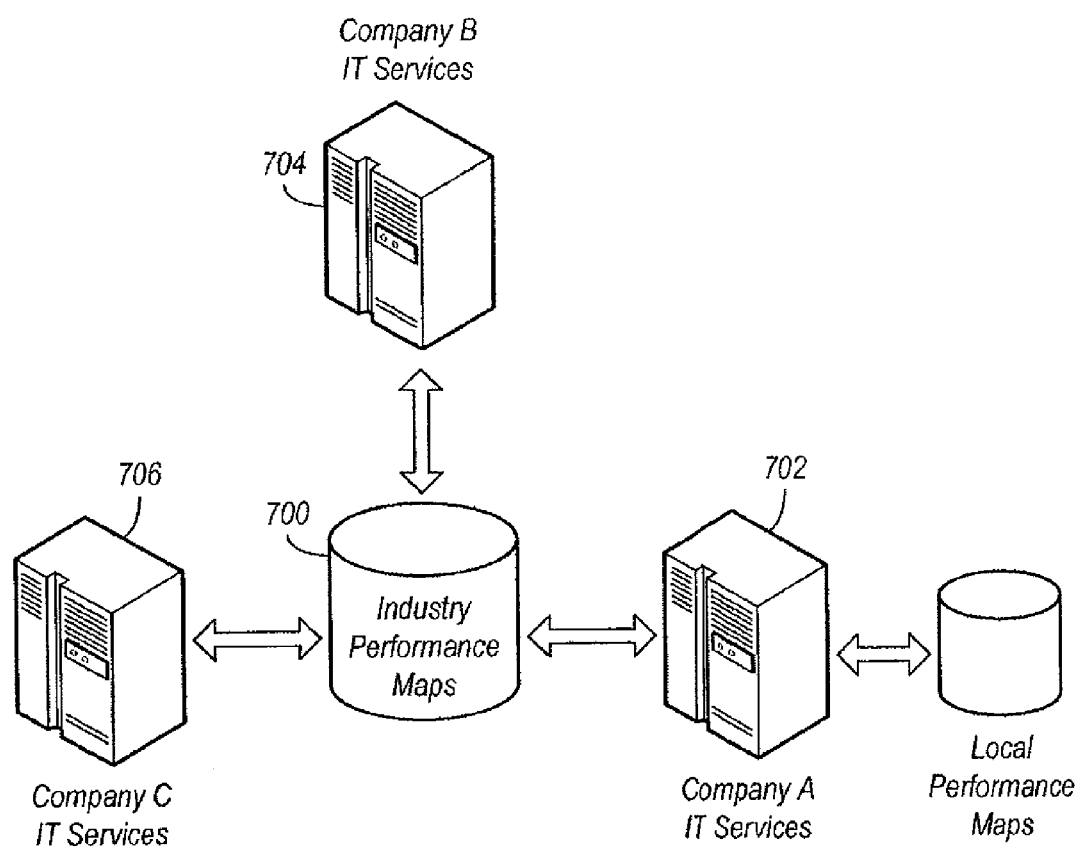
FIG. 7 illustrates an exemplary arrangement where businesses may participate in performance map sharing according to the disclosed embodiments.

FIG. 7 illustrates an example of a common database 700 that may be used to store the performance maps and/or the performance coefficients a, b and c for IT services of a given industry. Specifically, the performance maps and performance coefficients a, b and c for the IT services of businesses 702, 704, and 706 may be stored in the common database 700. Of course, the common database 700 may also store other information needed to perform the intra-industry comparisons, such as system type, processor speed, type and amount of memory, size of hard drives, and the like. These performance maps and performance coefficients may then be used to perform intra-industry comparisons of various IT services. The performance maps and performance coefficients may be provided for a fee to businesses who do not contribute to the industry database 700 (or even to those who do), or they may be available free of charge. A portion or all of the fee may be apportioned among the businesses that contributed the industry database 700. Such an arrangement allows the businesses 702, 704, and 706 to evaluate how their IT services compare with those of their peers in the industry. Each of these businesses 702, 704, and 706 may also have a local database for storing their own performance maps, performance coefficients a, b and c and other information for internal future reference.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for mapping a performance of an IT service, the system comprising:
at least one subsystem configured to generate a performance curve for the IT service, the performance curve relating to a quadratic equation $X=aN^2+bN+c$, wherein a correlates with a number of resources that are shared by a number of other resources of the IT service, b correlates with a number of resources that affect a rate at which a throughput of the IT service changes when a number of other resources remain unchanged, and c correlates with a number of resources of the IT service that are fixed as a result of a configuration of the IT service, and wherein the performance curve displays the minimum and maximum performance boundaries for the IT service.

2. The system of claim 1, further comprising:
at least one subsystem configured to obtain performance data for an IT service, the performance data including mean service time per customer and one of: number of customers and thinking time.

3. The system of claim 2, further comprising:
at least one subsystem to generate a performance map that is a throughput performance map and the maximum boundary is the number of customers divided by the sum of the mean service time per customer and the thinking time.

4. The system of claim 2, further comprising:
at least one subsystem to generate a performance map that is a throughput performance map and the minimum boundary is the number of customers divided by the sum of the number of customers multiplied by the mean service time plus the thinking time per customer and the thinking time.

5. The system of claim 1, wherein the minimum and maximum performance boundaries are derived using elements of queuing theory, the elements of queuing theory include one of: Utilization Law, Little's Small, and Response Time Law.

6. The system of claim 1 further comprising:
at least one subsystem configured to predict, using the generated performance curve, a performance resulting from a contemplated change to the IT service.

7. The system of claim 1, wherein the IT service is supported by a single-server multi-queue queuing system.

8. A computer-implemented method of mapping a performance of an IT service, the method comprising:
generating a performance curve for the IT service, the performance curve relating to a quadratic equation $X=aN^2+bN+c$, wherein a correlates with a number of resources that are shared by a number of other resources of the IT service, b correlates with a number of resources that affect a rate at which a throughput of the IT service changes when a number of other resources remain unchanged, and c correlates with a number of resources of the IT service that are fixed as a result of a configuration of the IT service.

9. The method of claim 8, further comprising:
obtaining performance data for an IT service, the performance data including mean service time per customer and one of: number of customers and thinking time.

10. The method of claim 9, further comprising:
generating a performance map that is a throughput performance map and the maximum boundary is the number of customers divided by the sum of the mean service time per customer and the thinking time.

11. The method of claim 9, further comprising:
generating a performance map that is a throughput performance map and the minimum boundary is the number of customers divided by the sum of the number of customers multiplied by the mean service time plus the thinking time per customer and the thinking time.

12. The method of claim 8, wherein the minimum and maximum performance boundaries are derived using elements of queuing theory, the elements of queuing theory include one of: Utilization Law, Little's Small, and Response Time Law.

13. The method of claim 8 further comprising:
predicting, using the generated performance curve, a performance resulting from a contemplated change to the IT service.

14. The method of claim 8, wherein the IT service is supported by a single-server multi-queue queuing system.

15. A non-transitory computer-readable medium computer-readable instructions for mapping a performance of an IT service, the computer-readable instructions comprising instructions for causing a computer to:
generate a performance curve for the IT service, the performance curve relating to a quadratic equation $X=aN^2+bN+c$, wherein a correlates with a number of resources that are shared by a number of other resources of the IT service, b correlates with a number of resources that affect a rate at which a throughput of the IT service changes when a number of other resources remain unchanged, and c correlates with a number of resources of the IT service that are fixed as a result of a configuration of the IT service.

16. The computer-readable medium of claim 15, wherein the instructions further cause the computer to:
obtain performance data for an IT service, the performance data including mean service time per customer and one of: number of customers and thinking time.

17. The computer-readable medium of claim 16, wherein the instructions further cause the computer to:
generate a performance map that is a throughput performance map and the maximum boundary is the number of customers divided by the sum of the mean service time per customer and the thinking time.

18. The computer-readable medium of claim 16, wherein the instructions further cause the computer to:
generate a performance map that is a throughput performance map and the minimum boundary is the number of customers divided by the sum of the number of customers multiplied by the mean service time plus the thinking time per customer and the thinking time.

19. The computer-readable medium of claim 15, wherein the minimum and maximum performance boundaries are derived using elements of queuing theory, the elements of queuing theory include one of: Utilization Law, Little's Small, and Response Time Law.

20. The computer-readable medium of claim 15, the instructions further causing the computer to:
predict, using the generated performance curve, a performance resulting from a contemplated change to the IT service.

* * * * *